US012774889B2

(12) United States Patent
Nakayama et al.

(10) Patent No.: US 12,774,889 B2
(45) Date of Patent: Oct. 27, 2026

(54) TERMINAL DEVICE, MAGNETIC ANCHOR SYSTEM, AND POSITION DETERMINATION METHOD

(71) Applicants: INVENSENSE, INC, San Jose, CA (US); TDK—Japan, Tokyo (JP)

(72) Inventors: Takashi Nakayama, San Jose, CA (US); Gennadii Berkovich, Calgary (CA); Yusuke Ariake, Tokyo (JP); Shinji Higuma, Tokyo (JP); Chris Goodall, Calgary (CA)

( * ) Notice: Subject to any disclaimer, the term of this patent is extended or adjusted under 35 U.S.C. 154(b) by 0 days.

(21) Appl. No.: 18/287,168

(22) PCT Filed: Oct. 12, 2023

(86) PCT No.: PCT/US2023/035058
§ 371 (c)(1),
(2) Date: Oct. 16, 2023

(87) PCT Pub. No.: WO2024/086057
PCT Pub. Date: Apr. 25, 2024

(65) Prior Publication Data
US 2025/0237505 A1 Jul. 24, 2025

(30) Foreign Application Priority Data
Oct. 17, 2022 (JP) ................................ 2022-166467

(51) Int. Cl.
*G01C 21/08* (2006.01)
*G01C 21/16* (2006.01)
(Continued)

(52) U.S. Cl.
CPC ........... *G01C 21/08* (2013.01); *G01C 21/165* (2013.01); *G01C 21/206* (2013.01); *G01C 21/20* (2013.01); *G01S 19/42* (2013.01)

(58) Field of Classification Search
CPC .... G01C 21/08; G01C 21/165; G01C 21/206; G01C 21/20; G01S 19/42
See application file for complete search history.

(56) References Cited

U.S. PATENT DOCUMENTS

2006/0247847 A1* 11/2006 Carter ........................ B60T 7/18 701/498
2020/0320870 A1* 10/2020 Yamamoto ............. G08G 1/042

FOREIGN PATENT DOCUMENTS

CN 107421535 A * 12/2017 ............. G01C 21/08
WO WO 2007/085683 A1 8/2007

OTHER PUBLICATIONS

Kusche, et al ("Indoor Positioning via Artificial Magnetic Fields," in IEEE Transactions on Instrumentation and Measurement, vol. 70, pp. 1-9, 2021, Art No. 8502509, doi: 10.1109/TIM.2021.3073327) (Year: 2021).*

(Continued)

*Primary Examiner* — Christian T Bryant

(57) ABSTRACT

[Object] A terminal device that can perform positioning with high accuracy and at a low cost is provided.

[Solution] A terminal device that is held by a terminal holding object includes a magnetic detection unit configured to detect magnetic field produced by a magnetic anchor made of magnet; and a position information acquisition unit configured to acquire position information that corresponds to magnetic information detected by the magnetic detection unit by referring to correspondence between magnetic information and position information prepared in advance.

15 Claims, 8 Drawing Sheets

(51) Int. Cl.
*G01C 21/20* (2006.01)
*G01S 19/42* (2010.01)

(56) References Cited

OTHER PUBLICATIONS

Pasku et al. ("Magnetic Field-Based Positioning Systems," in IEEE Communications Surveys & Tutorials, vol. 19, No. 3, pp. 2003-2017, thirdquarter 2017, doi: 10.1109/COMST.2017.2684087.) (Year: 2017).*

Sheinker et al. (A method for indoor navigation based on magnetic beacons using smartphones and tablets, Measurement, vol. 81, 2016, pp. 197-209, ISSN 0263-2241, https://doi.org/10.1016/j.measurement.2015.12.023) (Year: 2016).*

Sheinker Arie et al: "A method for indoornavigation based on magnetic beacons using smartphones and tablets", Measurement, 81 (2016) 197-209.

* cited by examiner

Magnetic position correspondence table 1111

| Magnetic information | Position information |
|---|---|
| A1 | aaa |
| A2 | bbb |
| A3 | ccc |
| ⋮ | ⋮ |

1121

| Terminal ID/User ID | Position information | Time information |
|---|---|---|
| T001/0001 | aaa | α α α |
| T001/0001 | bbb | β β β |
| T002/0002 | ccc | γ γ γ |
| ⋮ | ⋮ | ⋮ |

TERMINAL DEVICE, MAGNETIC ANCHOR SYSTEM, AND POSITION DETERMINATION METHOD

CROSS-REFERENCE TO RELATED APPLICATIONS

This application claims priority to Japanese Patent Application No. 2022-166467, filed Oct. 17, 2022.

FIELD OF THE PRESENT DISCLOSURE

The present disclosure relates to a terminal device, a magnetic anchor system, and a position determination method.

BACKGROUND

In recent years, application software that obtains position information using the Global Positioning System (GPS) is installed in mobile terminals such as smartphones, which makes it possible to obtain current position information.

In addition, in an indoor environment, where the GPS function cannot be used, another method is used alone, or two or more other methods are used in combination, and thereby it is possible to obtain information of a current position (current position information).

Examples of such methods include known methods such as Wi-Fi-based positioning, in which a current position is calculated by performing a calculation based on a difference in radio wave strength from a plurality of Wi-Fi base stations, BLE beacon-based positioning, in which a current position is estimated based on a signal strength of a communication system called Bluetooth (registered trademark) low energy (BLE), and pedestrian dead reckoning (PDR), in which a movement direction and an amount of movement are estimated using measurements of inertial sensors such as accelerometers and gyroscopes provided in many smartphones.

Besides PDR, vehicle dead reckoning (VDR) can be used, which is also based on measurements from inertial sensors such as accelerometers and gyroscopes, and/or odometry sensors like a wheel sensor, a Doppler sensor, etc.

However, in the Wi-Fi-based positioning method, since the coverage area of a base station is about tens of meters in radius, it is necessary to arrange access points at a high density to acquire position information with high accuracy, which is costly. In addition, there may be places with restrictions on the arrangement of access points, such as places that radio waves do not reach or places where it is difficult to secure a power source.

In addition, for the BLE beacon-based positioning method, similarly, it is necessary to arrange transmitters at a high density to obtain position information with high accuracy, and furthermore the influence of the arrangement place of the transmitter on the accuracy is large, which may make it difficult to achieve positioning with high accuracy. Moreover, the transmitters require periodic maintenance such as battery replacement, which is labor intensive and costly.

The PDR and VDR methods has an advantage that no additional cost is required because it uses mobile terminals such as smartphones with inertial sensor functions, but there is a problem that errors may gradually increase due to accumulation of noise, and a deviation of the position information may increase. For this reason, with the PDR and VDR methods, it becomes necessary to perform processing of correcting the deviation of the position information in combination with other positioning methods, but as described above, the Wi-Fi-based positioning method or the beacon-based positioning method has problems in terms of accuracy, cost, restriction on the installation place, and labor for battery replacement.

PRIOR ART DOCUMENTS

Patent Document

[Patent Document 1]
Japanese Unexamined Patent Application, First Publication No. 2002-216286
[Patent Document 2]
Japanese Patent No. 6783751

SUMMARY

Problems to be Solved by the Invention

As described above, with conventional positioning technologies, it has sometimes been difficult to perform positioning with high accuracy and at a low cost.

Note that Patent Document 1 describes a magnet device for a magnetic marker (refer to Patent Document 1), but does not describe a specific example of positioning.

In addition, Patent Document 2 describes processing using map information of an area that includes a current position of a user of a portable device (refer to Patent Document 2), but does not describe a specific example of a magnetic anchor.

The present disclosure has been made in consideration of such circumstances, and aims to provide a terminal device, a magnetic anchor system, and a position determination method capable of performing positioning with high accuracy and at a low cost.

Means for Solving the Problems

According to one aspect of the present disclosure, a terminal device is a terminal device that is held by a terminal holding object, and includes a magnetic detection unit configured to detect magnetic field produced by a magnetic anchor made of a magnet, and a position information acquisition unit configured to acquire position information that corresponds to magnetic information detected by the magnetic detection unit by referring to a correspondence between magnetic information and position information prepared in advance.

According to another aspect of the present disclosure, a magnetic anchor system includes a plurality of magnetic anchors at different positions, in which each of the magnetic anchors is configured to include a magnet, and each of the magnetic anchors has a magnet arrangement pattern in which at least one of the number of the magnets, a type of the magnets, and an arrangement of the magnets is different, thereby producing magnetic field with the properties different from those of the other magnetic anchors.

According to still another aspect of the present disclosure, a position determination method by a terminal device that is held by a terminal holding object, using a plurality of magnetic anchors each configured from a magnet at different positions, the method comprises detecting, by a magnetic detection unit, magnetic field produced by the magnetic anchors, and acquiring, by a position information acquisition unit, position information that corresponds to magnetic information detected by the magnetic detection unit by referring to correspondence between magnetic information and position information prepared in advance.

Effects of the Invention

According to the terminal device, the magnetic anchor system, and the position determination method according to the present disclosure, it is possible to perform positioning with high accuracy and at a low cost.

DETAILED DESCRIPTION

Modes for Carrying Out the Invention

Hereinafter, an embodiment of the present disclosure will be described with reference to the drawings.

[Position Detection System]

Figure 1:
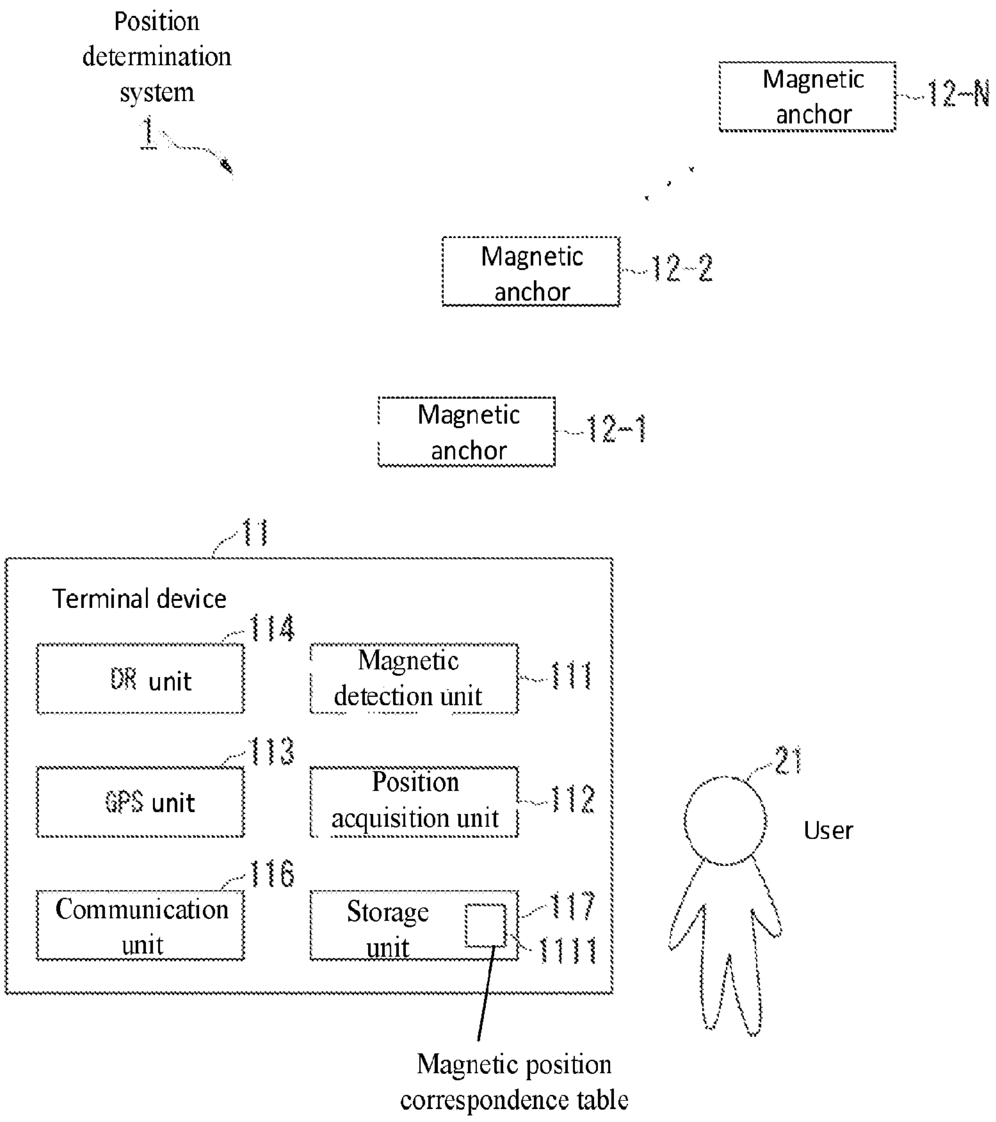
FIG. 1 is a diagram which shows an example of a schematic configuration of a position determination system according to an embodiment.

FIG. 1 is a diagram which shows an example of a schematic configuration of a position determination system 1 according to an embodiment.

The position determination system 1 includes a terminal device 11, and a plurality of N magnetic anchors 12-1 to 12-N.

In addition, a user 21 who uses the terminal device 11 is shown in FIG. 1.

Here, in the example of FIG. 1, one terminal device 11 is shown to simplify the description, but the position determination system 1 may have a plurality of terminal devices.

In addition, in the example of FIG. 1, the plurality of N magnetic anchors 12-1 to 12-N are shown, but the position detection system 1 may also include one magnetic anchor.

<Terminal Device>

The terminal device 11 can include a magnetic detection unit 111, a position information acquisition unit 112, a GPS unit 113, a dead reckoning (DR) unit 114, a communication unit 116, and a storage unit 117.

The storage unit 117 stores a magnetic position correspondence table 1111. The storage unit 117 may store any type of information.

Using measurements of a magnetometer, the magnetic detection unit 111 detects magnetic field produced by each of the magnetic anchors 12-1 to 12-N (magnetic field produced by each of the magnetic anchors 12-1 to 12-N). The magnetometer can be a part of the magnetic detection unit 111 or can be an external device.

The position information acquisition unit 112 specifies a position based on the magnetic field detected by the magnetic detection unit 111 and information of the magnetic position correspondence table 1111 stored in the storage unit 117 to acquire information on the specified position (position information).

The GPS unit 113 has a GPS receiver and acquires information on a position (for example, latitude and longitude). Note that it is possible to specify an absolute position using the GPS function.

Using measurements of inertial sensors (accelerometers and gyroscopes), the DR unit 114 acquires, for example, information on a position from a pedestrian dead reckoning (PDR) device having a PDR function. Note that it is possible to specify relative positions using the PDR function.

In the present embodiment, the PDR device may be attached to, for example, a belt or the like of the user 21.

Note that the DR unit 114 itself may have the function of a PDR device.

As another example, the DR unit 114 may acquire information on a position from a vehicle dead reckoning (VDR) device having a VDR function. Note that it is possible to specify relative positions using the VDR function.

In this case, the VDR device may be provided in, for example, a mobile object on which the terminal device 11 is mounted.

Note that the DR unit 114 itself may have the function of a VDR device.

Here, in the present embodiment, in the terminal device 11, the information acquired by the GPS unit 113 or the information acquired by the DR unit 114 may be used when a position is specified based on a detection result of the magnetic detection unit 111.

Note that the example of FIG. 1 shows a case where the terminal device 11 includes the GPS unit 113 and the DR unit 114, but as another example, the terminal device 11 may be configured without one or both of the GPS unit 113 and the DR unit 114.

As another example, the position information acquisition unit 112 may use a Wi-Fi positioning method, a BLE beacon proximity positioning method, or the like or may use these all together at the time of acquisition of position information.

Combination or integration of magnetic positioning and possibly other positioning methods with PDR or VDR can be used in the position information acquisition unit 112. As a result, in the present embodiment, the position of can be determined accurately than when only one positioning method is used. Combination or integration of magnetic positioning with PDR or VDR can improve positioning accuracy when operating indoors, whereas additional integration with GPS helps to further improve positioning accuracy outdoors. Other positioning methods, like Wi-Fi-based or BLE beacon-based, can also be integrated with magnetic-based positioning, GPS, and PDR or VDR.

The communication unit 116 has a function of performing communication.

The communication unit 116 may have, for example, a function of performing wireless communication of a mobile phone system.

Here, the terminal device 11 may be configured by installing a predetermined program in, for example, a general-purpose computer such as a smartphone, or may be configured as a dedicated device.

Note that, when the terminal device 11 (for example, a smartphone) is configured to have a magnetic detection function, for example, being equipped with a magnetometer, the magnetic detection function can be used in the magnetic detection unit 111.

<Magnetic Position Correspondence Table>

Figures 2, 3:
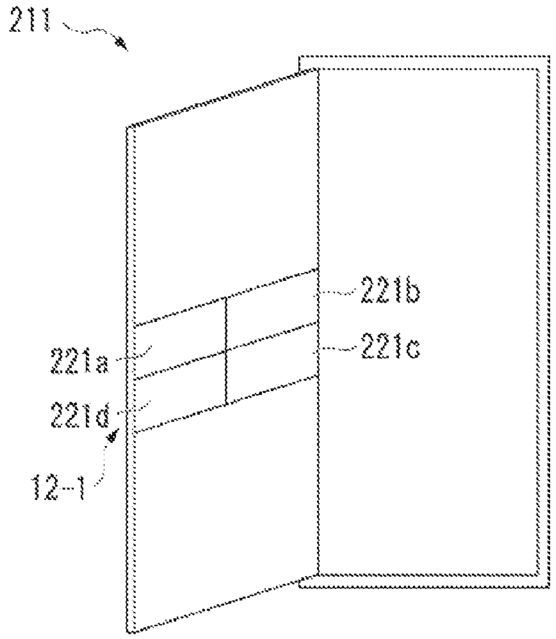
FIG. 2 is a diagram which shows an example of a magnetic position correspondence table that stores correspondence between magnetic information and position information according to the embodiment.
FIG. 3 is a diagram which shows an example of a magnetic anchor attached to a door according to the embodiment.

FIG. 2 is a diagram which shows an example of the magnetic position correspondence table 1111 that stores correspondence between magnetic information and position information according to the embodiment.

The magnetic position correspondence table 1111 stores information on magnetic field (magnetic information) and information on a position (position information) in association with each other.

Here, magnetic information and position information are determined and stored in advance based on an experiment or a theory.

In the present embodiment, position information is set for each of the magnetic anchors 12-1 to 12-N, and magnetic information is set for each of the magnetic anchors 12-1 to 12-N.

As the position information for each of the magnetic anchors 12-1 to 12-N, for example, information on positions in which each of the magnetic anchors 12-1 to 12-N is installed is used. In the present embodiment, each of the magnetic anchors 12-1 to 12-N is installed at a fixed position. In the present embodiment, different magnetic information is set for each of the magnetic anchors 12-1 to 12-N. As the magnetic information, information on magnetic field detected by the magnetic detection unit 111 of the terminal device 11 depending on the magnetic field of each of the magnetic anchors 12-1 to 12-N is used.

In the example of FIG. 2, the magnetic information is simply represented as "A1," "A2," and "A3," but any information may be used as the magnetic information, and for example, information related to magnetic field strength, horizontal and vertical components of magnetic field, a 3D vector of magnetic field, a waveform of magnetic signal, etc., which can be used separately or in a combination.

In the example of FIG. 2, the position information is simply represented as "aaa," "bbb," and "ccc," but any information may be used as the position information, and for example, information on latitude and longitude may be used or information representing three-axis positions in a three-dimensional space, or the like may also be used. In some embodiments, an altitude or a floor number can be used as a third coordinate.

In the present embodiment, a configuration in which the terminal device 11 stores the information of the storage unit 117 (for example, the information of the magnetic position correspondence table 1111) is shown, but a configuration in which the information is stored in an external device of the terminal device 11 (for example, a database) may also be used as another example. In this case, for example, the terminal device 11 may be able to store information in such an external device and to read the information stored in the external device.

<Magnetic Anchor>

FIG. 3 is a diagram which shows an example of a magnetic anchor 12-1 attached to a door 211 according to the embodiment.

In the example of FIG. 3, the magnetic anchor 12-1 is attached near a center of the door 211 in a height direction.

The magnetic anchor 12-1 has four magnets 221*a*, 221*b*, 221*c*, and 221*d*.

In the present embodiment, permanent magnets are used as the magnets 221*a* to 221*d* configuring the magnetic anchor 12-1.

Here, one magnetic anchor 12-1 has been described, but each of the other magnetic anchors 12-2 to 12-N also includes one or more magnets in a predetermined arrangement.

In the present embodiment, each of the magnetic anchors 12-1 to 12-N is configured such that the magnetic field detected by the magnetic detection unit 111 of the terminal device 11 is different for each of the magnetic anchors 12-1 to 12-N, depending on the magnetic field of each of the magnetic anchors 12-1 to 12-N.

There are no particular restrictions on a mode in which the magnetic anchor is installed. For example, it may be attached to another object such as a door, or it may be placed on a floor.

As a mode in which the magnetic anchor is attached to another object, for example, it may be attached using an adhesive or the like, or it may also be mechanically attached.

<Position Detection Processing>

Figure 4:
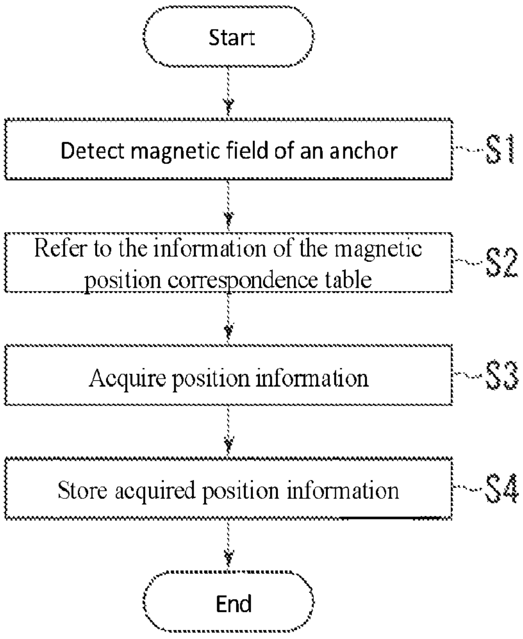
FIG. 4 is a diagram which shows an example of a procedure of position determination processing performed in a terminal device according to the embodiment.

FIG. 4 is a diagram which shows an example of a procedure of position determination processing performed in the terminal device 11 according to the embodiment.

(Step S1)

The terminal device 11 uses the magnetic detection unit 111 to detect the magnetic field produced by the magnetic anchor (for example, one of the magnetic anchors 12-1 to 12-N).

Then, in the terminal device 11, the procedure shifts to processing of step S2.

(Step S2)

The terminal device 11 refers to the information of the magnetic position correspondence table 1111 by the position information acquisition unit 112.

Then, in the terminal device 11, the procedure shifts to processing of step S3.

(Step S3)

Based on magnetic information detected by the magnetic detection unit 111 and the information in the magnetic position correspondence table 1111, the terminal device 11 specifies and acquires position information corresponding to the magnetic information by the position information acquisition unit 112.

Then, in the terminal device 11, the procedure shifts to processing of step S4.

(Step S4)

The terminal device 11 stores the position information acquired by the position information acquisition unit 112 in the storage unit 117.

Then, in the terminal device 11, processing of this flow ends.

Here, in the terminal device 11, for example, information that associates a time and a position may be stored in the storage unit 117.

Information on the time may include information such as year, month, day, hour, minute, and second.

<Configuration Example of Magnetic Anchor>

A specific configuration example of the magnetic anchor will be shown.

FIG. 5(A) is a diagram which shows a configuration example of a magnetic anchor 311 according to the embodiment, and FIG. 5(B) is a diagram which shows an example of a waveform detected by the terminal device 11.

In this example, the magnetic anchor 311 has a configuration in which four magnets 321*a*, 321*b*, 321*c*, and 321*d* are arranged side by side in contact with each other in one direction (a direction from top to bottom in the example of FIG. 5(A)) in order of description.

In the example of FIG. 5(A), when viewed in a predetermined direction (a direction in which a paper surface of FIG. 5(A) is viewed), fragments of each of the magnets 321*a* to 321*d* have the same shape of a rectangle and are arranged side by side such that long sides of the rectangles are in contact with each other between adjacent magnets.

In addition, in the example of FIG. 5(A), the four magnets 321*a* to 321*d* have the same three-dimensional shape, for example, a thin plate shape with the rectangular surfaces.

In the example of FIG. 5(A), when viewed from a predetermined direction (the direction in which the paper surface of FIG. 5(A) is viewed), respective poles of the magnets 321*a*, 321*b*, 321*c*, and 321*d* are an N pole, an S pole, an N pole, and an S pole, wherein N and S stand for magnet's north and south poles. In this example (and also in examples of FIG. 6 and FIG. 7), the rectangular magnets are magnetized through the thickness direction, so that if the surface of the magnet viewed on the picture is an N pole, then the opposite (unviewed) surface is an S pole of the magnet and vice versa.

In the present example, four rectangular (or bar) permanent magnets are used as the magnets 321*a* to 321*d*. However, other shapes of magnets, different number of magnets, and different directions of magnetization including multi-poles magnets can be also used.

FIG. 5(B) shows a magnetic waveform 2011 (a magnetic signal) detected by the magnetic detection unit 111 when the magnetic detection unit 111 of the terminal device 11 moves in a predetermined arrangement with respect to the magnetic anchor 311.

In a graph shown in FIG. 5(B), the horizontal axis represents a position (a relative position) of the terminal device 11 with respect to the magnetic anchor 311, and the vertical axis represents a strength of magnetic field detected by the magnetic detection unit 111. Note that when a moving direction and a moving speed of the terminal device 11 are determined, the position can be converted into a time.

FIG. 6(A) is a diagram which shows a configuration example of the magnetic anchor 331 according to the embodiment, and FIG. 6(B) is a diagram which shows an example of the waveforms detected by the terminal device 11.

In this example, the magnetic anchor 331 has a configuration in which four magnets 341*a*, 341*b*, 341*c*, and 341*d* are arranged in contact with each other in one direction (from top to bottom in the example of FIG. 6(A) in order of description).

In the example of FIG. 6(A), when viewed in a predetermined direction (a direction in which a paper surface of FIG. 6(A) is viewed), fragments of each of the magnets 341*a* to 341*d* have the same shape of a rectangle and are arranged side by side such that long sides of the rectangles are in contact with each other between adjacent magnets.

Also, in the example of FIG. 6(A), the four magnets 341*a* to 341*d* have the same three-dimensional shape, for example, a thin plate-like shape with the rectangular surfaces.

In the example of FIG. 6(A), when viewed in a predetermined direction (the direction in which the paper surface of FIG. 6(A) is viewed), respective poles of the magnets 341*a*, 341*b*, 341*c*, and 341*d* are an N pole, an S pole, an S pole, and an N pole.

In the present example, permanent magnets are used as the magnets 341*a* to 341*d*.

FIG. 6(B) shows a magnetic waveform 2021 (a magnetic signal) detected by the magnetic detection unit 111 when the magnetic detection unit 111 of the terminal device 11 moves in a predetermined arrangement with respect to the magnetic anchor 331.

In a graph shown in FIG. 6(B), the horizontal axis represents the position (the relative position) of the terminal device 11 with respect to the magnetic anchor 331, and the vertical axis represents the strength of the magnetic field detected by the magnetic detection unit 111. Note that when the moving direction and the moving speed of the terminal device 11 are determined, the position can be converted into a time.

FIG. 7(A) is a diagram which shows a configuration example of a magnetic anchor 351 according to the embodiment, and FIG. 7(B) is a diagram which shows an example of the waveform detected by the terminal device 11.

In this example, the magnetic anchor 351 is configured by arranging four magnets 361*a*, 361*b*, 361*c*, and 361*d* side by side in a predetermined arrangement. In this arrangement, the magnets 361*a* and 361*d* are arranged side by side in contact with each other in one direction (a direction from top to bottom in the example of FIG. 7(A)), the magnets 361*b* and 361*c* are arranged side by side in contact with each other in the one direction, the magnets 361*a* and 361*b* are arranged side by side in contact with each other in another direction (a direction from the left to right in the example of FIG. 7(A)), and the magnets 361*d* and 361*c* are arranged side by side in the another direction.

Note that in the example of FIG. 7(A), the one direction and the another direction are orthogonal to each other.

In the example of FIG. 7(A), when viewed in a predetermined direction (a direction in which a paper surface of FIG. 7(A) is viewed), fragments of each of the magnets 361*a* to 361*d* have the same rectangular shape, are arranged side by side such that long sides of the rectangles are in contact with each other between adjacent magnets in the one direction, and are arranged side by side such that short sides of the rectangles are in contact with each other between adjacent magnets in the another direction.

Also, in the example of FIG. 7(A), the four magnets 361*a* to 361*d* have the same three-dimensional shape, for example, a thin plate-like shape with the rectangular surfaces.

In the example of FIG. 7(A), when viewed in a predetermined direction (the direction in which the paper surface of FIG. 7(A) is viewed), respective poles of the magnets 361*a*, 361*b*, 361*c*, and 361*d* are an S pole, an N pole, an S pole, and an N pole.

In this example, permanent magnets are used as the magnets 361*a* to 361*d*.

FIG. 7(B) shows a magnetic waveform 2031 (a magnetic signal) detected by the magnetic detection unit 111 when the magnetic detection unit 111 of the terminal device 11 moves in a predetermined arrangement with respect to the magnetic anchor 351.

In the graph shown in FIG. 7(B), the horizontal axis represents the position (the relative position) of the terminal device 11 with respect to the magnetic anchor 351, and the vertical axis represents the strength of the magnetic field detected by the magnetic detection unit 111. Note that when the moving direction and the moving speed of the terminal device 11 are determined, the position can be converted into a time.

Here, as shown in FIGS. 5(B), 6(B), and 7(B), each of the magnetic anchors 311, 331, and 351 has a configuration in which different magnetic signal is detected by the magnetic detection unit 111 of the terminal device 11.

Moreover, in the present embodiment, each of the magnetic anchors 311, 331, and 351 is installed at different places.

In this manner, magnetic anchors (magnetic anchors 311, 331, and 351) having different magnet arrangement patterns for each place are installed, the magnetic detection unit 111 of the terminal device 11 detects magnetic signals corresponding to the magnet arrangement patterns, and thereby it is possible to specify each place (position) on the basis of the detected magnetic signal. Such information may be registered in the magnetic position correspondence table 1111 shown in FIG. 2.

In the present embodiment, it is assumed that, when the user 21 carries the terminal device 11 and passes near the magnetic anchors 311, 331, and 351, the magnetic detection unit 111 moves in a predetermined arrangement with respect to each of the magnetic anchors 311, 331, and 351.

As an example, the movement in such a predetermined arrangement may be realized manually by the user 21.

As another example, a passage of the terminal device 11 is prepared in advance such that the movement in such a predetermined arrangement is performed, and the user 21 may manually cause the terminal device 11 to pass through the passage.

As another example, when the magnetic detection unit 111 of the terminal device 11 moves near the magnetic anchors 311, 331, and 351, even if it moves in an arrangement different from the predetermined arrangement, it may have a function capable of identifying the magnet arrangement pattern of each of the magnetic anchors 311, 331, and 351 on the basis of detected magnetic signal.

In this function, for example, the magnetic detection unit 111 may store magnetic information detected in a plurality of relative arrangements for each of the magnetic anchors 311, 331, and 351, and identify (specify) one of the magnetic anchors 311, 331, and 351 on the basis of the information.

Moreover, in this function, for example, the magnetic detection unit 111 may apply a predetermined correction to the detected magnetic information and identify (specify) one of the magnetic anchors 311, 331, and 351 on the basis of the corrected information. As an example, the correction can account a type of magnets such as a specific magnetic material used for manufacturing of the magnet.

Figure 5:
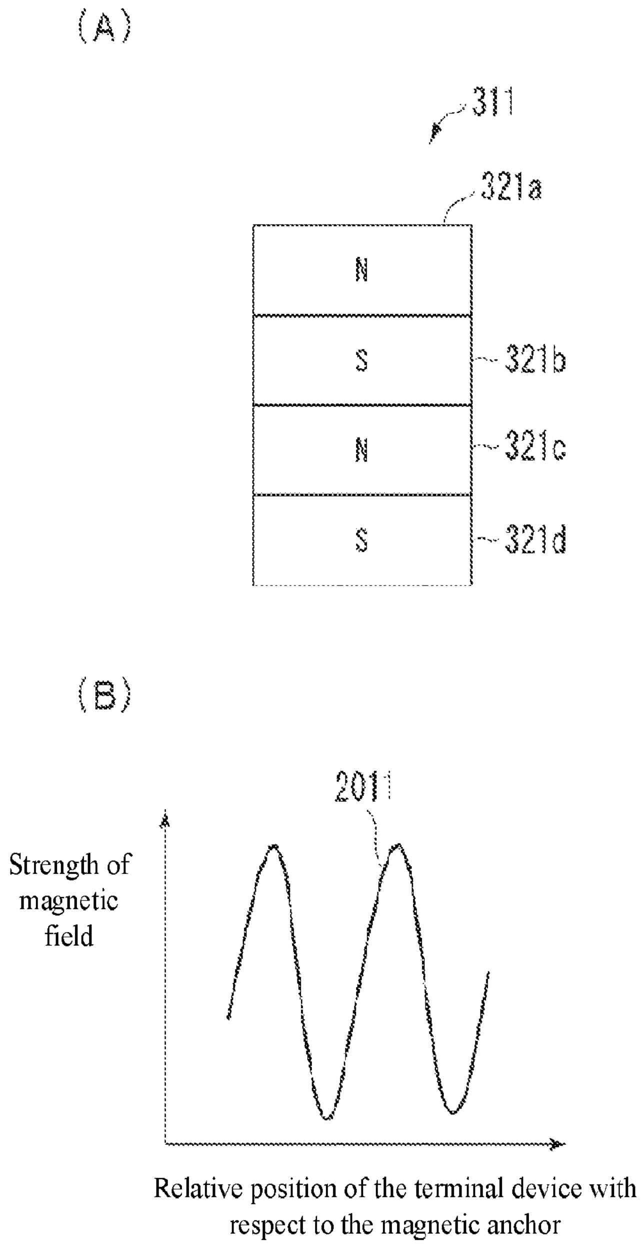
FIG. 5(A) is a diagram which shows a configuration example of the magnetic anchor according to the embodiment.
FIG. 5(B) is a diagram which shows an example of a waveform detected by the terminal device.
Figure 6:
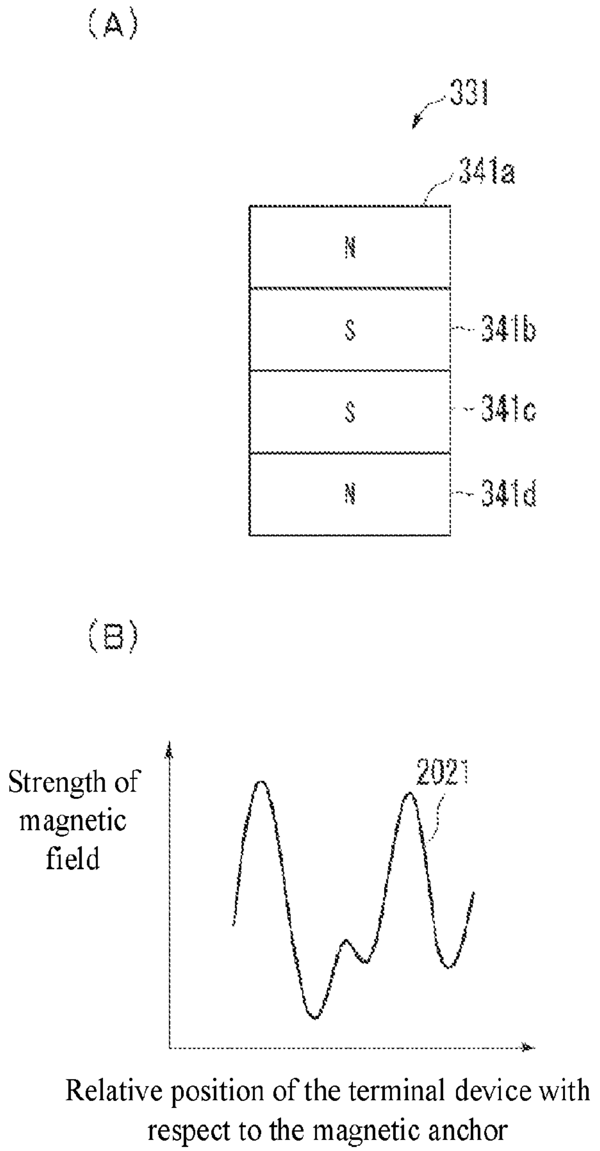
FIG. 6(A) is a diagram which shows a configuration example of the magnetic anchor according to the embodiment.
FIG. 6(B) is a diagram which shows an example of the waveform detected by the terminal device.
Figure 7:
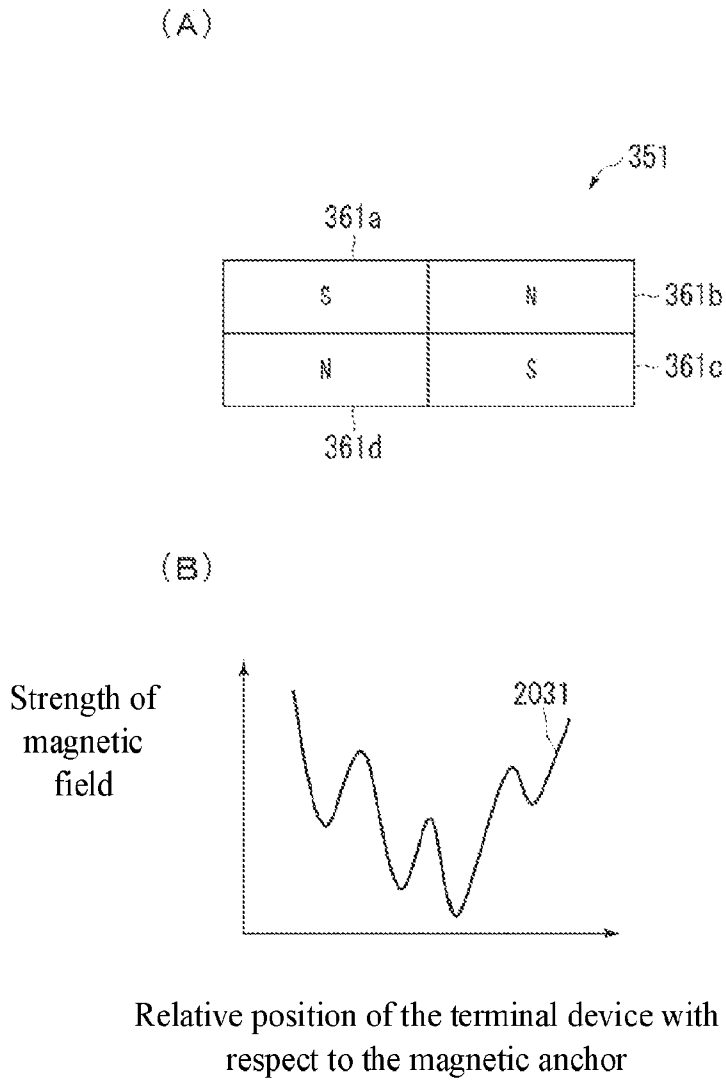
FIG. 7(A) is a diagram which shows a configuration example of the magnetic anchor according to the embodiment.
FIG. 7(B) is a diagram which shows an example of the waveform detected by the terminal device.

Although three types of magnet arrangement patterns are shown in FIGS. 5 to 7, the present invention is not limited to these, and other magnet arrangement patterns may also be used.

In addition, any number of magnetic anchors may be used as the plurality of magnetic anchors.

<A Plurality of Magnetic Anchors for Each Height>

Figure 8:
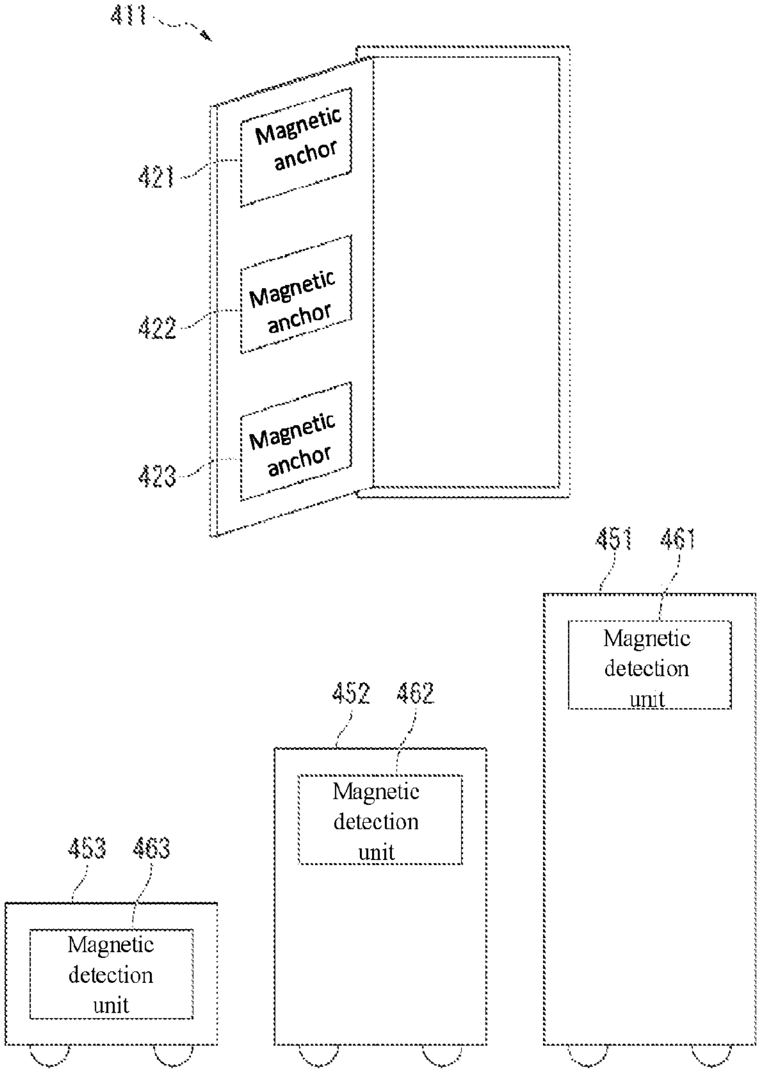
FIG. 8 is a diagram which shows an example of magnetic anchors attached at a plurality of heights on a door and an example of a mobile object according to the embodiment.

FIG. 8 is a diagram which shows an example of magnetic anchors 421 to 423 attached at a plurality of heights on a door 411 according to the embodiment and mobile objects 451 to 453.

In the example of FIG. 8, in the height direction (a vertical direction) of the door 411, a magnetic anchor 421, a magnetic anchor 422, and a magnetic anchor 423 are separated in this order from top to bottom and are installed on a surface of the door 411.

That is, relatively in the height direction, the magnetic anchor 421 is provided at the upper part, the magnetic anchor 422 is provided at the middle part, and the magnetic anchor 423 is provided at the lower part.

A mobile object 451 has a function of moving automatically or under control by an external control device.

The mobile object 451 includes a magnetic detection unit 461. The magnetic detection unit 461 has, for example, the same function as the magnetic detection unit 111 of the terminal device 11 shown in FIG. 1.

As an example, the mobile object 451 may have the same function as the terminal device 11 shown in FIG. 1. In this case, the mobile object 451 performs the same processing as the terminal device 11.

Note that the terminal device 11 may be mounted on the mobile object 451.

As another example, the mobile object 451 includes the magnetic detection unit 461 and a communication unit that transmits magnetic information detected by the magnetic detection unit 461 to a predetermined external device. Communication between the communication unit and the predetermined external device is, for example, wireless communication, but wired communication may also be used. In this case, the predetermined external device includes a processing unit other than the magnetic detection unit 111 of the terminal device 11 shown in FIG. 1. Furthermore, it has a function of a communication unit that receives magnetic information transmitted from the mobile object 451 and performs the same processing as the terminal device 11 on the basis of the magnetic information received from the mobile object 451. That is, in this case, it performs the same processing as the terminal device 11 in combination with the mobile object 451 and the predetermined device.

In the example of FIG. 8, the mobile object 451 is configured such that the magnetic detection unit 461 moves near the magnetic anchor 421 at the upper part of the door 411 when the mobile object 451 moves.

In this case, the magnetic detection unit 461 of the mobile object 451 detects magnetic field of the magnetic anchor 421 at the upper part of the door 411. A mobile object 452 includes a magnetic detection unit 462.

Here, a configuration and an operation of the mobile object 452 are similar to those of the mobile object 451, except that, for example, the magnetic detection unit 462 detects the magnetic field of the magnetic anchor 422 in the middle of the door 411.

The mobile object 452 is configured such that the magnetic detection unit 462 moves near the magnetic anchor 422 in the middle of the door 411 when the mobile object 452 moves.

A mobile object 453 includes a magnetic detection unit 463.

Here, a configuration and an operation of the mobile object 453 are similar to those of the mobile object 451, except that, for example, the magnetic detection unit 463 detects the magnetic field produced by the magnetic anchor 423 at a lower part of the door 411.

The mobile object 453 is configured such that the magnetic detection unit 463 moves near the magnetic anchor 423 in the middle of the door 411 when the mobile object 453 moves.

Like the three magnetic anchors 421 to 423, when the magnetic anchors 421 to 423 are each provided at different heights, it is possible to identify (specify) the mobile objects 451 to 453 on the basis of the magnetic field of which of the magnetic anchors 421 to 423 is detected by the magnetic detection units of the mobile objects 451 to 453.

That is, a mobile object that has detected the magnetic field of the magnetic anchor 421 can be identified as the mobile object 451, and a mobile object that has detected the magnetic field of the magnetic anchor 422 can be identified as the mobile object 452, and a mobile object that has detected the magnetic field of the magnetic anchor 423 can be identified as the mobile object 453.

Here, in the example of FIG. 8, a case in which magnetic anchors are provided at each of three levels in the height direction is shown, but the number of levels in the height direction may be any number of two or more.

In addition, in the example of FIG. 8, the mobile objects 451 to 453 are exemplified, but, for example, in a situation where a height at which a person carries the magnetic detection unit 111 (the terminal device 11) is determined for each person, it is possible to identify (specify) the terminal device 11 (a person who carries this) on the basis of which of the magnetic anchors 421 to 423 the magnetic detection unit 111 of the terminal device 11 has detected the magnetic field produced by the magnetic anchors.

One mobile object (or one person) may be associated with a magnetic anchor at the same height, or a group of a plurality of mobile objects (or a group of a plurality of persons) may be associated with a magnetic anchor at the same height.

[Comprehensive Position Determination System]

Figures 9, 10:
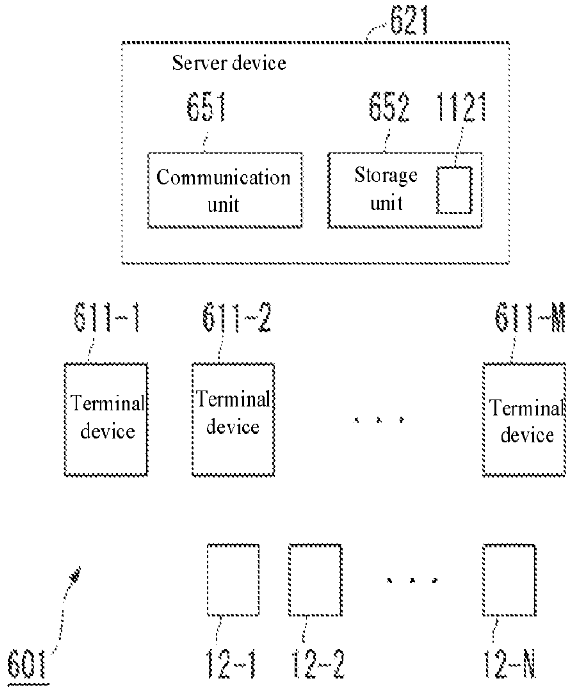
FIG. 9 is a diagram which shows an example of a schematic configuration of a comprehensive position determination system according to the embodiment.
FIG. 10 is a diagram which shows an example of a management table in a comprehensive position determination system according to the embodiment.

FIG. 9 is a diagram which shows an example of a schematic configuration of a comprehensive position determination system 601 according to the embodiment. The comprehensive position determination system 601 is an example of the position determination system.

The comprehensive position determination system 601 includes a plurality of M terminal devices 611-1 to 611-M, a plurality of N magnetic anchors 12-1 to 12-N, and a server device 621.

Here, the magnetic anchors 12-1 to 12-N are the same as those shown in FIG. 1 and are denoted by the same reference numerals for convenience of description.

In addition, each of the terminal devices 611-1 to 611-M has the same function as the terminal device 11 shown in FIG. 1.

In the example of FIG. 9, a position determination system including the terminal devices 611-1 to 611-M and the magnetic anchors 12-1 to 12-N is configured. That is, in the example of FIG. 9, the comprehensive position determination system 601 includes the position determination system and the server device 621.

<Server Device>

The server device 621 includes a communication unit 651 and a storage unit 652.

The communication unit 651 has a function of performing communication.

The storage unit 652 stores a comprehensive management table 1121.

The storage unit 652 may store any information.

In the example of FIG. 9, a communication unit (the same function as the communication unit 116 shown in FIG. 1) of each of the terminal devices 611-1 to 611-M wirelessly communicates with the communication unit 651 of the server device 621. Then, each of the terminal devices 611-1 to 611-M transmits predetermined information to the server device 621.

The predetermined information includes, for example, identification information (terminal ID) for identifying each of the terminal devices 611-1 to 611-M, information on a specified position, and information on a time corresponding to the position (for example, a time at which the position has been specified or a predetermined time in the vicinity thereof) for each of the terminal devices 611-1 to 611-M.

The server device 621 stores the information received from the terminal devices 611-1 to 611-M in the comprehensive management table 1121 and manages it.

Here, along with the identification information of each of the terminal devices 611-1 to 611-M, or instead of the identification information of each of the terminal devices 611-1 to 611-M, identification information for identifying a user of each of the terminal devices 611-1 to 611-M (a user ID) may be used.

Each of the terminal devices 611-1 to 611-M may use, for example, a part or all of login information received from the users as the user ID.

<Comprehensive Management Table>

FIG. 10 is a diagram which shows an example of the comprehensive management table 1121 in the comprehensive position determination system 601 according to the embodiment.

The comprehensive management table 1121 stores one or both of a terminal ID and a user ID (terminal ID/user ID), position information, and time information in association with each other.

In the server device 621, it is possible to collectively manage information on a plurality of terminal devices 611-1 to 611-M according to the information of the comprehensive management table 1121.

In the example of FIG. 10, the terminal ID is represented as "T001" and "T002," but any information may be used as the terminal ID.

In the example of FIG. 10, the user ID is represented as "0001" and "0002," but any information may be used as the user ID.

In the example of FIG. 10, the time information is simply represented as "ααα," "βββ," and "γγγ," but any information may be used as the time information, for example, information on the time may include information such as year, month, day, hour, minute, and second.

The position information in the example in FIG. 10 is the same as in the example in FIG. 2.

Regarding the Embodiment Described Above

As described above, in the position determination system 1 according to the present embodiment, it is possible to perform positioning (position determination) with high accuracy and at a low cost.

In the position determination system 1 according to the present embodiment, a configuration using the terminal device 11 and the magnetic anchors 12-1 to 12-N make it possible to realize positioning (position determination) with high accuracy and at a low cost.

In the position determination system 1 according to the present embodiment, positioning with high accuracy can be performed at a low introduction cost, thereby improving convenience of a user. In the present embodiment, the magnetic anchors 12-1 to 12-N do not require a power supply such as a battery regardless of the installation place and can provide a sustainable solution.

In the position detection system 1 according to the present embodiment, by installing the magnetic anchors 12-1 to 12-N at a specific position, it is possible to grasp an entry or exit of a person or the like at the specific position, and it is possible to manage, for example, a timing when the person or the like enters a specific room, or a timing when the person or the like leaves the specific room.

Moreover, in the position determination system 1 according to the present embodiment, by installing the magnetic anchors 12-1 to 12-N on a specific object, it is possible to grasp a usage status of the specific object by a person or the like, and it is possible to manage, for example, a timing when the person or the like starts using the specific object, or a timing when the person or the like finishes using the specific object.

The object is not particularly limited, and, for example, a desk, a chair, or various devices, facilities, or the like in a factory, hospital, or the like may also be used.

For example, the object is fixed at a fixed position, but as another example, a movable object whose position can be grasped may also be used.

In addition, the position determination system 1 according to the present embodiment can be applied to, for example, tracking of the position in real-time, and can manage dynamic information.

In addition, the position determination system 1 according to the present embodiment can be applied indoors where GPS radio waves do not reach, for example, by using information on magnetic field.

When the magnetic anchors 12-1 to 12-N are used, for example, it is possible to realize power source free, location free (this means that the magnetic anchor can be installed everywhere), and maintenance free.

Here, in places where the magnetic anchors 12-1 to 12-N are not present, the terminal device 11 may detect natural geomagnetic field using the magnetic detection unit 111, and specify the position (acquire position information) on the basis of a result of the detection. This is possible due to variations of Earth magnetic field indoors caused by ferrous materials used in the construction of the buildings. Instead of or in addition to artificial magnetic anchors, we can use natural geomagnetic anchors created by variations of geomagnetic field indoors.

In this case, for example, a correspondence table of the detection result and the position information of the natural geomagnetic field is stored in advance in the storage unit 117 of the terminal device 11 or in another database. Magnetic data about natural geomagnetic anchors are stored in the same storage unit 117 as the data about artificial magnetic anchors. The magnetic data about natural geomagnetic anchors can be obtained in advance, for example, by a regular survey (or mapping) of geomagnetic field of some area indoors, or by crowdsourcing activity in the area. It is notable that when containing the magnetic data about natural geomagnetic anchors, the magnetic position correspondence table 1111 can be considered as a map of geomagnetic field of the area. Then, the position information acquisition unit 112 of the terminal device 11 specifies the position based on the detection result of the geomagnetic field by the magnetic detection unit 111 and acquires the position information on the basis of the information of the correspondence table. The information of the correspondence table may also be integrated with, for example, the information of the magnetic position correspondence table 1111. Therefore, the proposed solution supports using for positioning both artificial magnetic anchors and natural geomagnetic field.

By surveying or crowdsourcing the geomagnetic field in advance, it is possible to perform positioning on the position (for example, the current location) of the terminal device 11 by comparing the magnetic data acquired by the terminal device 11 with the information of the magnetic position correspondence table 1111.

In the present embodiment, apart from naturally positioned geomagnetic field, positioning with high accuracy can be performed by using anchors (the magnetic anchors 12-1 to 12-N) made of magnets and creating a magnetic distribution with specificity on a layout.

Combining magnetic field of the Earth indoors, i.e., produced by natural magnetic anchors, and magnetic field produced by (artificial) magnetic anchors can help to improve accuracy of magnetic-based positioning indoors. For example, some areas inside the building can lack ferrous materials and therefore magnetic field in these areas will be the same in different locations. Deployment of magnetic anchors in such areas will introduce unique features to the combined magnetic map that contributes to improving positioning accuracy.

In another example, geomagnetic field indoors may have the same value in different locations. Deployment magnetic anchors will introduce unique features to the combined magnetic map in this case as well and will contribute improving positioning accuracy.

For example, at construction sites where there is no power supply, it is possible to use a wireless beacon device, for example, a BLE beacon, for positioning that uses a battery as an anchor and install it at a position to be detected in detail, but, with that alone, it is necessary to deal with waterproofing, battery consumption, maintenance, and the like. On the other hand, in the present embodiment, the same result can be achieved by using a magnetic anchor that does not require a power source regardless of an installation place and can be used permanently.

In the position detection system 1 according to the present embodiment, for example, by arranging the magnetic anchors 12-1 to 12-N on a surface of a door, a frame of the door, or a handrail of an entrance or exit door, it is possible to reliably detect that a person or the like has passed through an important position.

In the comprehensive position detection system 601 according to the present embodiment, it is also possible to comprehensively manage the movement of each terminal holding object for the plurality of magnetic anchors 12-1 to 12-N and the plurality of terminal devices 611-1 to 611-M (a plurality of terminal holding objects).

For example, in the magnetic anchors 12-1 to 12-N for acquiring position information, which are configured from permanent magnets, when the magnetically detectable terminal device 11 possessed by the terminal holding object has detected magnetic field produced by the magnetic anchors 12-1 to 12-N, it is possible to specify a position (for example, a current position) by referring to the magnetic information measured in association with the position information in advance.

In the position determination system 1, a positioning method that uses the magnetic anchors 12-1 to 12-N to acquire the position information is used.

In the terminal device 11, since positioning is performed when the terminal device 11 approaches a distance (for example, ten and several centimeters) where the magnetism of the magnetic anchors 12-1 to 12-N reaches, highly accurate positioning can be performed.

Since the magnetic anchors 12-1 to 12-N are configured from permanent magnets, there is no need to secure a power source or perform maintenance, and costs can be kept low.

For example, in each of the magnetic anchors 12-1 to 12-N, it is possible to generate a plurality of pieces of specific magnetic information by combining the number of magnets, a type of magnets including material, a shape of magnets, a direction of magnetization, etc., and an arrangement of magnets in different patterns.

As a result, it is possible to associate specific magnetic field information by correlating the magnetic anchors 12-1 to 12-N having different magnet arrangement patterns to each of a plurality of pieces of position information.

For example, the terminal holding object is a person (for example, the user 21 who owns the terminal), a motor vehicle, or a robot that can travel autonomously.

The motor vehicle is not particularly limited, and for example, a vehicle that moves electrically or by an engine may be used.

In this manner, various objects can be used as the terminal holding object.

An automatic guided vehicle (AGV) may be used as the terminal holding object.

Here, when the terminal holding object is a motor vehicle or a robot, a function of a terminal device mounted on the terminal holding object may store, for example, identification information of the terminal holding object in advance. In this case, the function of the terminal device uses, for example, the identification information of the terminal holding object instead of the user ID.

For example, in the terminal device 11, a combination of a methods using the magnetic anchors 12-1 to 12-N and the PDR may also be used to improve positioning accuracy and improve convenience of the user. This can be obtained, for example, by using a state estimation technique to fuse the magnetic and the inertial data. For example, a particle filter (PF), or an extended Kalman filter (EKF) can be used. The filtering approach using PF and EKF in general includes prediction and update stages that are repeated iteratively. On the prediction stage, the filter prognoses the position using PDR data, such as a step length and an increment of the heading, as an input. On the update stage, measurements of magnetic field of the artificial magnetic anchors and/or natural geomagnetic anchors are used for updating the position (and correcting the errors accumulated by PDR) when a terminal device approaches the artificial magnetic or natural geomagnetic anchor. The fusion of magnetic and inertial data allows to obtain accurate user's positions not only being close to the anchors, but also between the anchors when the magnetic anchors are separated from each other by some distance. This effect is exhibited even when the terminal holding object is, for example, a person and the person moves freely.

For example, in the terminal device 11, a combination of the method using the magnetic anchors 12-1 to 12-N and the VDR may also be used to improve positioning accuracy and improve convenience of the user as was described above for the PDR case. This effect is exhibited even when the terminal holding object is, for example, a motor vehicle or a robot and the terminal holding object moves freely.

Further, the similar approach can be used for fusion magnetic and inertial data with GNSS data when they are available, or/and with Wi-Fi data and other types of measurements that contributes for further improving accuracy of positioning.

For example, by installing the magnetic anchors 12-1 to 12-N according to a height in a space, it is possible to specify the terminal holding object according to which of the magnetic anchors 12-1 to 12-N whose magnetic field is to be detected.

As a result, for example, it is possible to identify a holding object (the terminal holding object) of the terminal device 11 on the basis of magnetic information of the magnetic anchors 12-1 to 12-N detected by the terminal device 11.

As a specific example, when a position of a height of the magnetic detection unit 111 (for example, a certain height range) is different depending on whether the terminal holding object is a person, a motor vehicle, or a robot, it is possible to determine which is the terminal holding object.

Note that a program for realizing functions of any component in any device described above may be recorded in a computer-readable recording medium, and the program may be read into a computer system and executed. It is assumed that "computer system" as used herein includes an operating system or hardware such as peripheral devices. In addition, "computer-readable recording medium" refers to a portable medium such as a flexible disk, an optical magnetism disc, a ROM, or a compact disc (CD)-read only memory (ROM), or a storage device such as a hard disk embedded in a computer system. In addition, it is assumed that "computer-readable recording medium" includes those that hold a program for a certain period of time, such as volatile memory inside a computer system that serves as a server or client when the program is transmitted via a network such as the Internet or a communication line such as a telephone line. The volatile memory may be, for example, a random access memory (RAM). The recording medium may be, for example, a non-transitory recording medium.

In addition, the program described above may be transmitted from a computer system that stores this program in a storage device or the like to another computer system via a transmission medium or by transmission waves in a transmission medium. Here, the "transmission medium" for transmitting the program refers to a medium having a function of transmitting information, such as a network such as the Internet or a communication line such as a telephone line.

Moreover, the program described above may be a program for realizing some of the functions described above. Furthermore, the program described above may also be a so-called difference file that can realize the functions described above in combination with a program already recorded in a computer system. A difference file, which may be called a difference program, represents changes between two versions of firmware or software. This file allows to reduce amount of data that needs to be transferred and reducing the time required for the updating process.

In addition, the functions of any component in any device described above may be realized by a processor. For example, each processing in the embodiment may be realized by a processor that operates based on information such as a program, and a computer-readable recording medium that stores the information such as a program. Here, in the processor, for example, the function of each part may be realized by separate hardware, or the function of each part may be realized by integrated hardware. For example, the processor may include hardware, and the hardware may include at least one of a circuit that processes digital signals and a circuit that processes analog signals. For example, the processor may be configured using one or a plurality of circuit devices and/or one or a plurality of circuit elements mounted on a circuit board. An integrated circuit (IC) or the like may be used as the circuit device, and a resistor, a capacitor, or the like may be used as the circuit element.

Here, the processor may be, for example, a CPU. However, the processor is not limited to the CPU, and, for example, various processors such as a graphics processing unit (GPU) or a digital signal processor (DSP) may also be used. In addition, the processor may be, for example, a hardware circuit based on an application specific integrated circuit (ASIC). Moreover, the processor may be configured from, for example, a plurality of CPUs, or may be configured from a plurality of hardware circuits based on the ASIC. Moreover, the processor may be configured from, for example, a combination of a plurality of CPUs and a plurality of hardware circuits based on the ASIC. Moreover, the processor may include, for example, one or more of an amplifier circuit, a filter circuit, and the like for processing analog signals.

Although the embodiment of this disclosure has been described in detail with reference to the drawings, a specific configuration is not limited to the present embodiment, and includes a design and the like in a range not departing from the gist of this disclosure.

APPENDIX

Configuration examples will be shown below.

Configuration Example 1

A terminal device is a terminal device that is held by a terminal holding object, and includes a magnetic detection unit configured to detect magnetic field produced by a magnetic anchor made of magnet, and a position information acquisition unit configured to acquire position information that corresponds to magnetic information detected by the magnetic detection unit by referring to correspondence between magnetic information and position information prepared in advance.

Here, the magnetic position correspondence table 1111 shown in FIG. 2 is an example of the correspondence between magnetic information and position information.

Configuration Example 2

The terminal device according to [Configuration example 1], in which the terminal holding object is a person, a motor vehicle, or a robot that can travel autonomously.

Note that a configuration in which a motor vehicle and a robot are integrated may be used, and in this case, it may be called a motor vehicle, may be called a robot, or may also be called any other name.

Configuration Example 3

The terminal device according to [Configuration example 1] or [Configuration example 2], in which the position information acquisition unit acquires the position information by using information of pedestrian dead reckoning.

Configuration Example 4

The terminal device according to any one of [Configuration example 1] to [Configuration example 3], in which the position information acquisition unit acquires the position information by using information of vehicle dead reckoning.

Note that, for example, any one of the information of pedestrian dead reckoning and the information of vehicle dead reckoning may be used, or both of them may be used.

Configuration Example 5

The terminal device according to any one of [Configuration example 1] to [Configuration example 4], in which the magnetic anchor is installed at each of two or more different heights in a space, and the magnetic detection unit detects magnetic field produced by the magnetic anchor installed at any height depending on an arrangement of the magnetic detection unit when held by the terminal holding object.

For example, it is possible to provide a system in which the plurality of magnetic anchors is installed at different positions (a magnetic anchor system).

Configuration Example 6

A magnetic anchor system includes a plurality of magnetic anchors at different positions, in which each of the magnetic anchors is configured to include a magnet, and each of the magnetic anchors has a magnet arrangement pattern in which at least one of the number of the magnets, a type of the magnets, and an arrangement of the magnets is different, thereby generating magnetic field with properties different from those of the other magnetic anchors.

Configuration Example 7

The magnetic anchor system according to [Configuration example 6], in which the magnetic anchor is used to acquire position information of a terminal device that detects magnetic field produced by the magnetic anchor.

Configuration Example 8

The magnetic anchor system according to [Configuration example 6] or [Configuration example 7], in which the magnetic anchors are installed at two or more different heights in a space, and the magnetic anchors are used to acquire position information of different terminal devices for respective heights where the magnetic anchors are installed.

Configuration Example 9

The magnetic anchor system according to any one of [Configuration example 6] to [Configuration example 8], in which variations of geomagnetic field or natural geomagnetic anchors are further used to acquire position information of a terminal device.

For example, it is possible to provide a method for various types of processing performed by a position detection system or the magnetic anchor system (for example, a position detection method).

Configuration Example 10

A position determination method by a terminal device that is held by a terminal holding object, using a plurality of magnetic anchors each configured from a magnet at different positions, the method comprising: detecting, by a magnetic detection unit, magnetic field produced by the magnetic anchors, and acquiring, by a position information acquisition unit, position information that corresponds to magnetic information detected by the magnetic detection unit by referring to correspondence between magnetic information and position information prepared in advance.

EXPLANATION OF REFERENCES

1 Position detection system
11, 611-1 to 611-M Terminal device

12-1 to 12-N, 311, 331, 351, 421 to 423 Magnetic anchor
21 User
111, 461 o 463 Magnetic detection unit
112 Position information acquisition unit
113 GPS unit
114 DR unit
116 Communication unit
117, 652 Storage unit
211, 411 Door
221*a* to 221*d*, 321*a* to 321*d*, 341*a* to 341*d*, 361*a* to 361*d* Magnet
451 to 453 Mobile object
601 Comprehensive position detection system
621 Server device
651 Communication unit
1111 Magnetic position correspondence table
1121 Comprehensive management table

What is claimed is:

1. A terminal device that is held by a terminal holding object, comprising:

a magnetic detection unit configured to detect magnetic field produced from a magnetic anchor made of magnet; and a position information acquisition unit configured to acquire position information that corresponds to magnetic information detected by the magnetic detection unit by referring to correspondence between magnetic information and position information prepared in advance, wherein the correspondence comprises a magnetic position correspondence table that stores, for each of a plurality of magnetic anchors, (i) magnetic information and (ii) position information associated with the magnetic information, wherein the position information acquisition unit is configured to identify one of the plurality of magnetic anchors based on the magnetic information detected by the magnetic detection unit by referring to the magnetic position correspondence table, and acquire the position information associated with the identified magnetic anchor, and wherein the magnetic information comprises information about the magnetic field detected by the magnetic detection unit.

2. The terminal device according to claim 1, wherein the terminal holding object is a person, a motor vehicle, or a robot that can travel autonomously.

3. The terminal device according to claim 1 or 2, wherein the position information acquisition unit acquires the position information by using information of pedestrian dead reckoning.

4. The terminal device according to claim 1 or 2, wherein the position information acquisition unit acquires the position information by using information of vehicle dead reckoning.

5. The terminal device according to claim 1 or 2, wherein each magnetic anchor of the plurality of magnetic anchors is installed at each of two or more different heights in a space, and the magnetic detection unit detects magnetic field produced from a magnetic anchor installed at any height depending on an arrangement of the magnetic detection unit when held by the terminal holding object.

6. The terminal device according to claim 1, wherein the magnetic information comprises at least one of magnetic field strength, a horizontal component and a vertical component of magnetic field, and a three-dimensional vector of magnetic field.

7. The terminal device according to claim 1, wherein the magnetic information comprises a waveform of a magnetic signal detected by the magnetic detection unit.

8. The terminal device according to claim 1, wherein the magnetic detection unit applies a correction to the magnetic information detected by the magnetic detection unit before the position information acquisition unit identifies the magnetic anchor.

9. A magnetic anchor system comprising:

a plurality of magnetic anchors at different positions, wherein each of the magnetic anchors is configured to include a magnet, and each of the magnetic anchors has a magnet arrangement pattern in which at least one of the number of the magnets, a type of the magnets, and an arrangement of the magnets is different, thereby producing magnetic field with properties different from those of the other magnetic anchors, wherein each of the magnetic anchors is configured such that magnetic information detected by a magnetometer comprising information about the magnetic field differs among the magnetic anchors due to the magnet arrangement pattern, thereby enabling identification of a magnetic anchor based on detected magnetic information.

10. The magnetic anchor system according to claim 9, further comprising at least one terminal device comprising a magnetic detection unit configured to detect magnetic field produced from a magnetic anchor made of magnet;

and a position information acquisition unit configured to acquire position information that corresponds to magnetic information detected by the magnetic detection unit by referring to correspondence between magnetic information and position information prepared in advance.

11. The magnetic anchor system according to claim 9 or 10, further comprising a plurality of terminal devices, wherein each terminal device comprises a magnetic detection unit configured to detect magnetic field produced from a magnetic anchor made of magnet; and a position information acquisition unit configured to acquire position information that corresponds to magnetic information detected by the magnetic detection unit by referring to correspondence between magnetic information and position information prepared in advance and wherein the magnetic anchors are installed at two or more different heights in a space, and the detected magnetic fields from the magnetic anchors are used by the position acquisition units of different terminal devices for respective heights where the magnetic anchors are installed.

12. The magnetic anchor system according to claim 9 or 10, wherein natural geomagnetic field anchors created by variations of geomagnetic field are further used to acquire position information of a terminal device in combination with the magnetic field information from the plurality of magnetic anchors.

13. A position determination method by a terminal device that is held in a terminal holding object, using a plurality of magnetic anchors each configured from a magnet at different positions, the method comprising:

detecting, by a magnetic detection unit, magnetic field produced from the magnetic anchors; and acquiring, by a position information acquisition unit, position information that corresponds to magnetic information detected by the magnetic detection unit by referring to correspondence between magnetic information and position information prepared in advance, wherein the correspondence comprises a magnetic position correspondence table that stores, for each of a plurality of magnetic anchors, (i) magnetic information and (ii) position information associated with the magnetic information, wherein acquiring position information comprises identifying one of the plurality of magnetic anchors based on the magnetic information detected by the magnetic detection unit by referring to the magnetic position correspondence table, and acquiring the position information associated with the identified magnetic anchor, and wherein the magnetic information comprises information about the magnetic field detected by the magnetic detection unit.

14. The method according to claim 13, wherein the magnetic information comprises a waveform of a magnetic signal detected by the magnetic detection unit.

15. The method according to claim 13, wherein the magnetic information comprises at least one of magnetic field strength, a horizontal component and a vertical component of magnetic field, and a three-dimensional vector of magnetic field.

* * * * *